(12) United States Patent
Dasari

(10) Patent No.: US 12,259,901 B2
(45) Date of Patent: *Mar. 25, 2025

(54) SYSTEMS AND METHODS FOR UNIVERSAL DATA INGESTION

(71) Applicant: JPMORGAN CHASE BANK, N.A., New York, NY (US)

(72) Inventor: Srinu Dasari, Euless, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,346

(22) Filed: Apr. 5, 2023

(65) Prior Publication Data

US 2023/0244688 A1     Aug. 3, 2023

Related U.S. Application Data

(63) Continuation of application No. 17/405,924, filed on Aug. 18, 2021, now Pat. No. 11,675,804.

(51) Int. Cl.
| | | |
|---|---|---|
| *G06F 16/00* | (2019.01) | |
| *G06F 9/50* | (2006.01) | |
| *G06F 16/11* | (2019.01) | |
| *G06F 16/215* | (2019.01) | |
| *G06F 16/23* | (2019.01) | |
| *G06F 16/25* | (2019.01) | |

(52) U.S. Cl.
CPC .......... *G06F 16/254* (2019.01); *G06F 9/5083* (2013.01); *G06F 16/116* (2019.01); *G06F 16/215* (2019.01); *G06F 16/2365* (2019.01); *G06F 2209/505* (2013.01)

(58) Field of Classification Search
CPC .. G06F 16/116; G06F 16/215; G06F 16/2365; G06F 16/254; G06F 16/258; G06F 9/5083; G06F 2209/505
See application file for complete search history.

(56) References Cited

U.S. PATENT DOCUMENTS

| | | | | |
|---|---|---|---|---|
| 5,724,539 A | * | 3/1998 | Riggle | .................. G06F 3/0631 370/468 |
| 6,067,203 A | * | 5/2000 | Ottesen | .................. G11B 19/26 360/99.18 |
| 11,113,294 B1 | * | 9/2021 | Bourbie | ............ G06F 16/24568 |

(Continued)

*Primary Examiner* — Diedra McQuitery
(74) *Attorney, Agent, or Firm* — GREENBERG TRAURIG LLP

(57) ABSTRACT

Systems and methods for ingesting different data types using a are disclosed. According to one embodiment, a method for universal data ingestion may include: (1) receiving, at a data ingestion layer in a multi-layer pod, data from a data producer, wherein the data may be in any format; (2) ingesting, by the data ingestion layer, the data using a producer proxy agent or an ingestion application programming interface (API); (3) staging, by a data messaging/staging layer in the multi-layer pod, the ingested data; (4) enriching or transforming, by a data enrichment/transformation layer in the multi-layer pod, the staged data based on at least one customer requirement; and (5) routing, by a data connection layer in the multi-layer pod, the enriched or transformed data from the data messaging/staging layer to a data store at an appropriate velocity.

20 Claims, 2 Drawing Sheets

(56) References Cited

U.S. PATENT DOCUMENTS

| | | | | |
|---|---|---|---|---|
| 2002/0065982 | A1* | 5/2002 | Colligan | G06F 3/0613 |
| | | | | 711/171 |
| 2018/0068004 | A1* | 3/2018 | Lavasani | G06F 16/28 |
| 2018/0089324 | A1* | 3/2018 | Pal | G06F 9/546 |
| 2018/0332064 | A1* | 11/2018 | Harris | H04L 43/08 |
| 2019/0272271 | A1* | 9/2019 | Bhattacharjee | G06F 16/2471 |
| 2020/0314173 | A1* | 10/2020 | Pahwa | G06F 9/5072 |
| 2022/0368646 | A1* | 11/2022 | Vedam | H04L 47/781 |

* cited by examiner

SYSTEMS AND METHODS FOR UNIVERSAL DATA INGESTION

RELATED APPLICATIONS

This application is a Continuation of U.S. patent application Ser. No. 17/405,924, now U.S. Pat. No. 11,675,804, filed Aug. 18, 2021, the disclosure of which is hereby incorporated, by reference, in its entirety.

BACKGROUND OF THE INVENTION

1. Field of the Invention

Embodiments relate generally to systems and methods for universal data ingestion.

2. Description of the Related Art

Large organizations typically use products from multiple vendors. Each vendor, however, provides different types of products, and each product has different types of versions, data formats, and different protocols. These differences require multiple data ingestion layers in order to ingest the data from these products into the organization's systems.

SUMMARY OF THE INVENTION

Systems and methods for universal data ingestion are disclosed. According to one embodiment, a method for universal data ingestion may include: (1) receiving, at a data ingestion layer in a multi-layer pod, data from a data producer, wherein the data may be in any format; (2) ingesting, by the data ingestion layer, the data using a producer proxy agent or an ingestion application programming interface (API); (3) staging, by a data messaging/staging layer in the multi-layer pod, the ingested data; (4) enriching or transforming, by a data enrichment/transformation layer in the multi-layer pod, the staged data based on at least one customer requirement; and (5) routing, by a data connection layer in the multi-layer pod, the enriched or transformed data from the data messaging/staging layer to a data store at an appropriate velocity.

In one embodiment, the method may further include storing, by a data archive layer, the enriched or transformed data.

In one embodiment, the method may further include onboarding the data producer.

In one embodiment, the data producer may be onboarded using a self-service process.

In one embodiment, the data ingestion layer may receive the data from a load balancer. In one embodiment, the load balancer may select the data ingestion layer based on geography to minimize latency.

In one embodiment, the customer requirement may include inserting a new time stamp, replacing an IP address with a host name, and replacing code with a description.

In one embodiment, the enriched/transformed data may be pushed or pulled to a customer data store.

In one embodiment, a data contract governs the ingestion of the data, the transformation of the data, and the storage of the data.

In one embodiment, the data store may be identified during onboarding.

According to another embodiment, a system may include a plurality of data producers and a multi-layer pod. The multi-layer pod may include a data collection layer, a data ingestion layer, a data messaging/staging layer, a data enrichment/transform layer, a data connection layer, and a plurality of data stores. The data ingestion layer may be configured to receive data from one or more of the plurality of data producers, wherein the data may be in any format. The data ingestion layer may be configured to ingest the data using a producer proxy agent or an ingestion application programming interface (API). The data messaging/staging layer may be configured to stage the ingested data. The enrichment/transformation layer may be configured to enrich or transform the staged data based on at least one customer requirement. The data connection layer may be configured to route the enriched or transformed data from the data messaging/staging layer to a data store at an appropriate velocity.

In one embodiment, the electronic device may further include a data archiving layer. The data archiving layer may be configured to store the enriched or transformed data.

In one embodiment, the data ingestion layer may be further configured to receive the data from a load balancer. The load balancer may be configured to select the data ingestion layer based on geography to minimize latency.

In one embodiment, the customer requirement may include inserting a new time stamp, replacing an IP address with a host name, and replacing code with a description.

In one embodiment, the enriched/transformed data may be pushed or pulled to a customer data store.

In one embodiment, the data store may be identified during onboarding.

In one embodiment, a data contract may govern the ingestion of the data, the transformation of the data, and the storage of the data.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for universal data ingestion.

Embodiments provide a universal ingestion layer that may ingest/capture Events (E), logs (L), metrics (M), alerts (A), business data types, and may reference Data (R) with standard patterns and formats (e.g., structured, unstructured and semi-structured) in batch-time, near-real time, and real-time to distribute into hot, cold and archive stores. Embodiments may also support business/application data in addition to machine data. Availability, resiliency, confidentiality, speed, and completeness of data are key architectural design factors to handle high data ingestion rates, data enrichment requirements, and distributing data to different consumer stores. Embodiments provide a universal onboarding platform for machine and infrastructure data (ELMA-R) that supports any data format and any ingestion protocol (e.g., API, TCP, UDP, HTTP, SFTP, SNMP, HL7, etc.).

Embodiments may provide a pod including several layers, and each layer may be provided with fail-over, highly available, and alternate-approach capabilities. Example layers include a collection layer that may support various collection agents to collect the data; an ingestion layer that supports various ingestion mechanisms, data types, protocols, etc. that may have producer proxy agent (PPA), and an ingestion—API layer to allow any type of clients/agents; a messaging/staging layer that may have a Kafka cluster and provided by an internal Kafka service; a data enrichment/transformation layer that may have Kafka-SQL (SQL based) and Kafka-Streams (procedure based) clusters to support data transformation and data pipelines in transforming the data in real-time (savings on storage); and a data connect layer that may have Kafka-connect clusters to push data into any consumer stores (supports 500+ types of stores) and supports low-code approach.

In one embodiment, a data archiving layer may be provided to archive data into object or any data store for archive requirements, compliance and audit purposes.

Embodiment may provide a pod including layers necessary to handle all routing/tagging/enrichment/staging/connect requirements, or as a "mini pod" with an ingestion/PPA layer to tag/route/buffer data and connect to any other Full-POD in other data centers. In one embodiment, one or more pods may be provided for a data center.

Embodiments may provide non-production environments (development, testing, performance, etc.) and expanded production environments across the multiple datacenters/regions across the world to reduce latency and manage real-time data. Unified URL end points may be provided pods, and the use of a load balancer and domain name service allows collection agents to send data to the nearest pod for ingestion.

Figure 1:
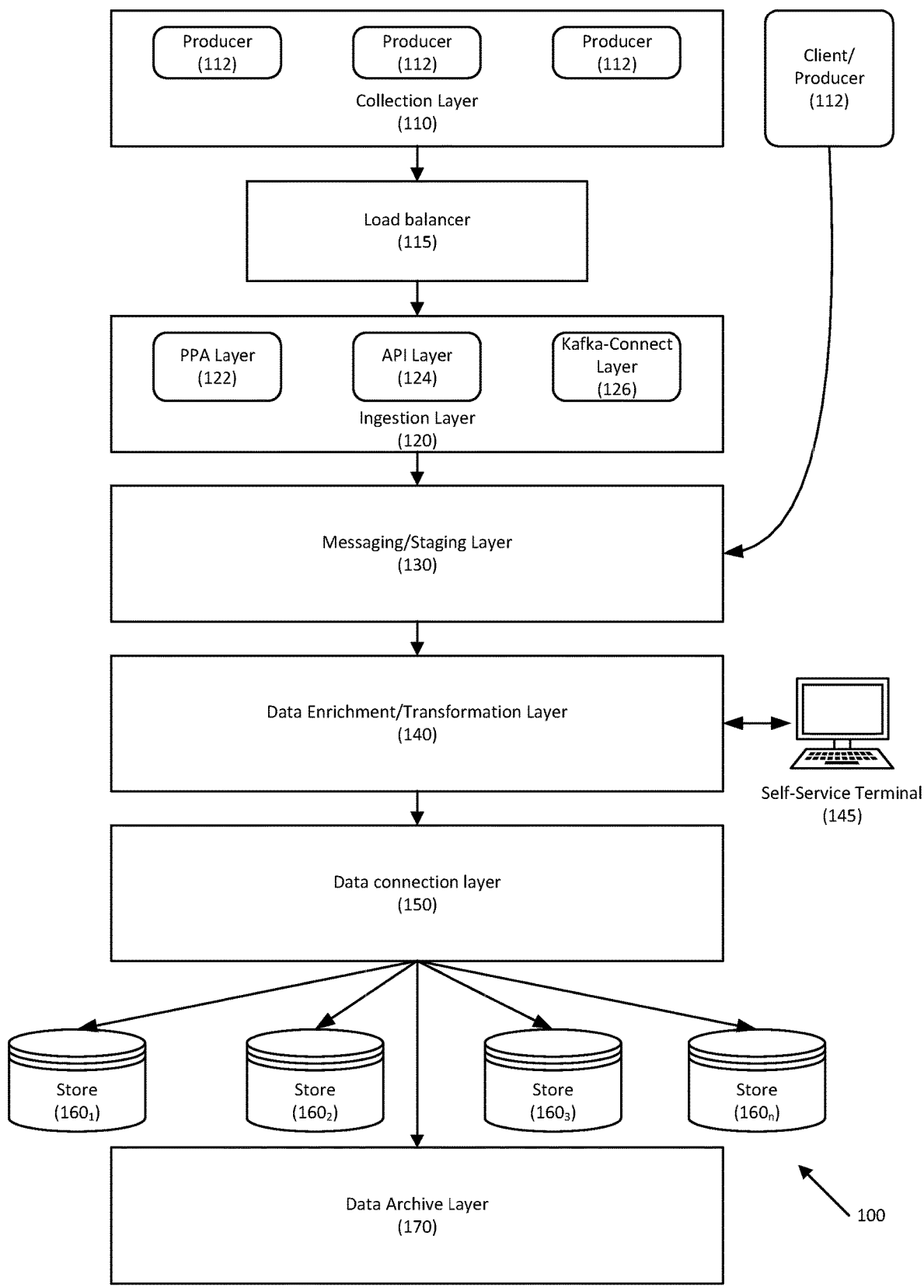
FIG. 1 depicts a system for universal data ingestion according to an embodiment.

Referring to FIG. 1, a system for universal data ingestion is disclosed according to an embodiment. System 100 may include collection layer 110, load balancer 115, ingestion layer 120, messaging/staging layer 130, data enrichment/transformation layer, self-service terminal 145, data connection layer, a plurality of stores 160, and data archive layer 170. Layers 110, 120, 130, 140, 150, and 160 may be considered to be a "pod." Data archive layer 170 may be provided separately from the pod.

Data collection layer 110 may include a plurality of producers 112, such as agents, native methods, custom code, clients, etc. Data may flow from producer 112 to ingestion layer 120 based on the data's protocol and data type (ELMAR) requirement. Examples of producers 112 may include virtual, physical, or container nodes, GTI, CTC, Gaia, etc. Producers 112 may be located in any suitable zone, including Enterprise Servers Farms (ESFs), Secure Enterprise Server Farms (SESF), and public cloud zones. For example, traffic may enter a data center from a DMZ, and may then travel to a SESF, and then to an ESF.

Producers 112 may connect to ingestion layer 120 using load balancer 115, which may provide a global load balanced and DNS based end-point URL with fail-over connect feature. Load balancer 115 may connect to a primary pod/data center based on proximity, and may fail-over to the next pod/data center if primary pod/data center is not available. Load balancer 115 may resolve network overhead of region/data center originated traffic routing and may route to the nearest pod give better performance based on network latency.

Embodiments may provide two types of connectivity mechanism for producers 112: (1) proximity based connection and (2) direct connectivity. Proximity based connection may connect producers 112 with the nearest pod and, while direct connectivity connection connects producers 112 to a specific pod and may limit the connectivity as per configuration.

Ingestion layer 120 may provide two types of load balanced solutions: (1) Producer proxy agent (PPA) layer 122 and (2) ingestion API layer 124. PPA layer 122 allows for ingestion of all data types and all protocols (tcp, udp, ftp etc.) in secured manner. PPA layer 122 may hold the data for certain number of days if there are issues or messaging/staging layer 130 is not available. PPA layer 122 may handle large-volume datasets, and may perform tagging, routing, and buffering features as is necessary and/or desired.

In embodiments, ingestion layer 120 may support both push and pull mechanisms. Both PPA layer 122 and ingestion API layer 124 support push mechanisms, and Kafka-connect layer 126 supports pull mechanisms for, for example, Relational Database Management Systems, NoSQL etc.

Ingestion API layer 124 allows http/https producers 112 and recommended for metrics. Metrics data may be structured data with payloads.

Messaging/Staging layer 130 may be a cluster solution and may receive ingested data from ingestion layer 120 and from direct-Kafka clients (not shown). The Kafka cluster is highly available and covers many failure issues without any data loss. In one embodiment, an internal Kafka service may provide a clustered solution that may span across a data center.

Messaging/staging layer 130 may also store data temporarily for re-sending data when a downstream layer (e.g., data connect layer 150, stores 160) is not available for any reason. It may apply a back-pressure pattern to avoid any data loss.

Data Enrichment/Transformation Layer 140 may be a Kafka-SQL (KSQL) cluster solution and may connect to any pod to support the transformation with velocity. Data Enrichment/Transformation Layer 140 may transform/enrich the data by retrieving the data from Kafka and may store the transformed/enriched data in messaging/staging layer 130 with the processed topic. Data Enrichment/Transformation Layer 140 may also store the transformed/enriched data in a different place after the data is transformed (e.g., storing in messaging/staging layer 130 under a different table or topic, in store 160 based on customer requirements, etc. Examples of transformations include tagging, lookup-replacements, replacing codes with values, routing based on values, changing from schemas per customer/business needs, etc.

Data connect layer 150 may be a Kafka-connect (KConnect) cluster solution and may connect to any pod. It may also ingest/push data to any store 160 with an appropriate velocity. If stores 160 are not available or slow, Kafka-connect nodes may retry until stores 160 are available and also tuned as per store 160 acceptable speed.

Stores 160 may include any suitable consumer data store, including cold or hot stores, and may support both push and pull methods to store the data in stores 160 based on their velocity.

In one embodiment, one or more orchestrator computer program (not shown) may be provided for each layer 110, 120, 130, 140, 150, and 160, for a plurality of layers (e.g., two or more of layers 110, 120, 130, 140, 150, and 160), etc. In embodiments, orchestrator computer program may be a service that may configure each layer 110, 120, 130, 140, 150, and 160, and may execute tasks as is necessary and/or desired.

Terminal 145 may provide self-service capabilities. This allows producers 112 and consumers to self-on-board applications to publish or consume from system 100. Self-service may also provide capabilities to administer/maintain the on-boarded feeds/applications.

In embodiments, a self-service application or program may be deployed in a Gaia Application Platform. The self-service application may provide the following: users may access the application through web interface through load balancer 115; self-service APIs may be exposed through Apigee; self-service may be integrated with organizational internal systems; self-service may connect to the pod to automate the feed onboarding through application as a service (AAAS) automation.

In another embodiment, ingestion layer 120 may be provided to, for example, different zones of a data center independently of the other layers, and may perform tagging/routing/transformation functions. For example, ingestion layer 120 may be provided based on security importance of the data in the zone and other factors.

In embodiments, each layer may have resiliency to protect data from data loss, and may resend the data when a down-stream layer is not available.

Figure 2:
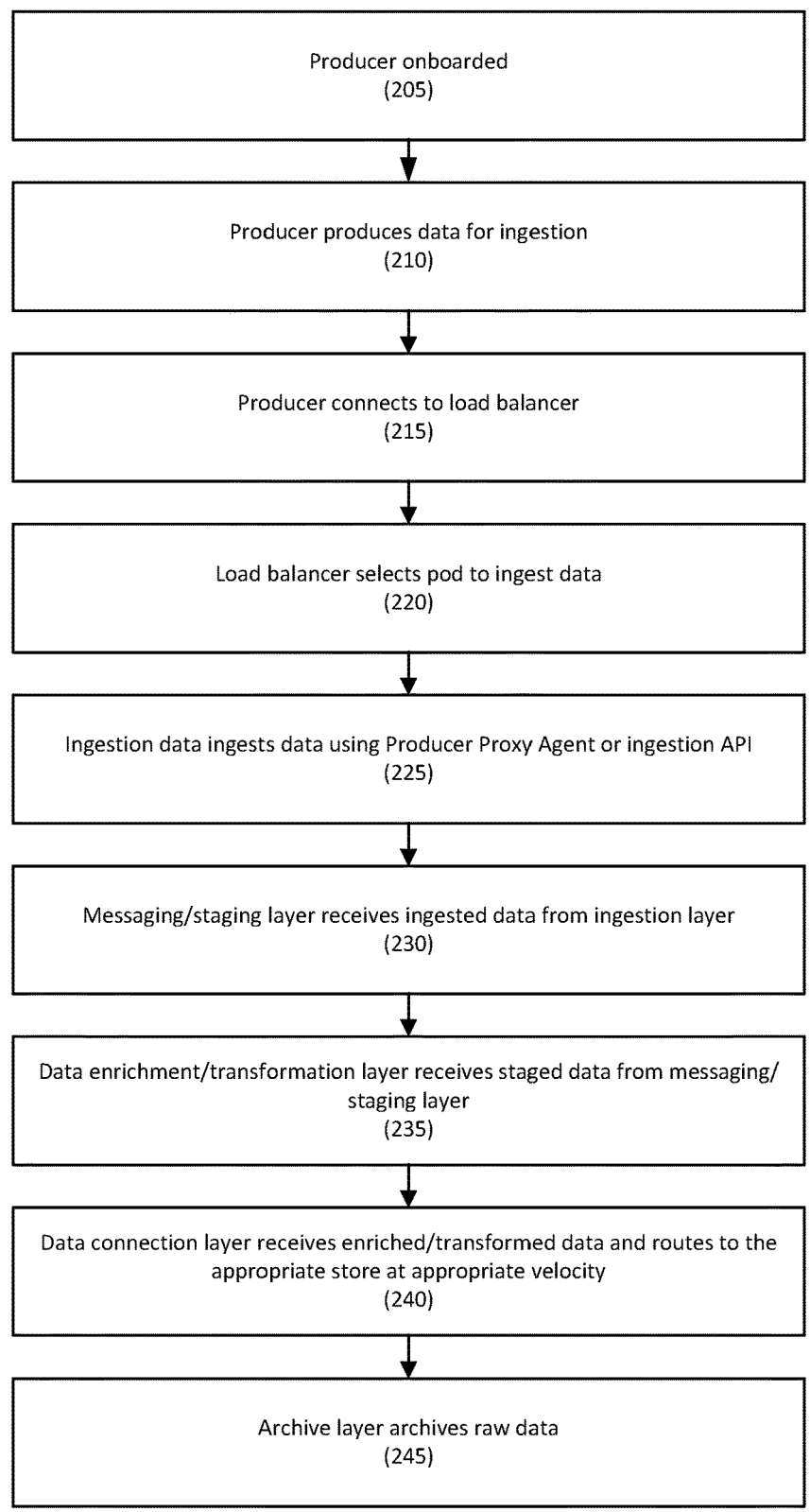
FIG. 2 depicts a method for universal data ingestion according to an embodiment.

Referring to FIG. 2, a method for universal data ingestion is disclosed according to an embodiment. In embodiments, users may use self-service to select the method and complete the onboarding tasks In step 205, a producer may be onboarded. In embodiment, details about the producer, the data it produces, the desired store, etc. may be onboarded using a self-service onboarding application. For example, a user may provide the details via a self-service interface, and then layers of a pod (e.g., a collection layer, an ingestion layer, a messaging/staging layer, a data enrichment/transformation layer, a data connection layer, and a plurality of stores) may be configured via API.

In one embodiment, an orchestration computer program may configure one or more layers of the pod and may be configured to execute tasks executed by the pod.

In one embodiment, during the onboarding process, a data contract may be created. The data contract may apply to the ingestion of data, the transformation of data, and the storage of data. For example, the data contract may be a "non-paper based contract" that may be created as a part of onboarding to place the data into tables. The data contract may apply to one or more layers for configuring as specified by the user during onboarding.

In step 210, the producer may produce data to be ingested.

In step 215, the producer may connect to a load balancer, and in step 220, the load balancer may select a pod to ingest the data. In one embodiment, the pod may be selected based on geography to minimize latency. In another embodiment, a specific pod, which may be identified during onboarding, may be selected.

In step 225, the ingestion layer at the selected pod may ingest the data from the producer. In one embodiment, the ingestion layer may use a producer proxy agent or an ingestion API to ingest the data.

In step 230, a data messaging/staging layer may receive the ingested data from the ingestion layer. In one embodiment, the data ingestion layer may keep data for a period of time (e.g., 3 days) for example, if the data messaging layer is unavailable. The data messaging/staging layer may temporarily store the data when consumers (e.g., large stores such as Splunk, Elasticsearch, Hadoop, Influx DB, Cassandra, etc.) are not able to consume at the same speed the data is being produced by a producer. In addition, the data messaging/staging layer may receive data directly from customers (e.g., producers, consumers, etc.) when, for example, the customers have built-in industry protocols to send data to Kafka.

In step 235, a data enrichment/transformation layer may receive the staged data from messaging/staging layer. The data enrichment/transformation layer may enrich and/or transform the data based on at least one customer requirement. Examples of enrichment or transformation may include schema or data product enhancements, tagging, lookup-replacements, replacing codes with values, routing based on values, changing from schemas per customer/business needs, inserting new time stamps, replacing IP addresses with host names, etc.

The data enrichment/transformation layer may return the enriched/transformed data to the data messaging layer, where a customer may use a pull or push method to store the data in one or more data store.

In step 240, a data connection layer may receive the enriched/transformed data from the data messaging layer and may route it to one or more appropriate store at the appropriate velocity. For example, the appropriate store may be identified during onboarding, and the appropriate velocity may be based on the speed at which the store can accept the data.

In step 245, the data may be archived in an archive layer for long term storage. In embodiments, the archive layer may store the raw data so that it may be reproduced as necessary, and to meet any compliance requirements.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for ingesting different data types, comprising:
providing, in a datacenter, a multi-layer pod comprising a data ingestion layer, a data enrichment/transformation layer, and a data connection layer, wherein the multi-layer pod is executed by a computer processor;
receiving, at the data ingestion layer, data from a data producer, wherein the data is received in any format and the data ingestion layer supports both push and pull data ingestion mechanisms;
ingesting, by the data ingestion layer, the data using a producer proxy agent that securely ingests data of any format;
enriching or transforming, by the data enrichment/transformation layer, the data by inserting a new time stamp in the data; and
routing, by the data connection layer, the enriched or transformed data to a data store at a velocity for the data store.

2. The method of claim 1, further comprising:
storing, by a data archive layer, the enriched or transformed data.

3. The method of claim 1, further comprising:
onboarding the data producer.

4. The method of claim 3, wherein the data producer is onboarded using a self-service process.

5. The method of claim 1, wherein the data ingestion layer receives the data from a load balancer.

6. The method of claim 5, wherein the load balancer selects the data ingestion layer based on geography to minimize latency.

7. The method of claim 1, wherein the enriched or transformed data is pushed or pulled to a customer data store.

8. The method of claim 1, wherein a data contract governs the ingestion of the data, the enriching or the transforming of the data, and storage of the enriched or transformed data.

9. The method of claim 1, wherein the data store is identified during onboarding.

10. A system, comprising:
a plurality of data producers; and
a multi-layer pod that is executed by a computer processor in a datacenter, wherein the multi-layer pod comprises a data collection layer, a data ingestion layer, a data enrichment/transformation layer, a data connection layer, and a plurality of data stores;
wherein:
the data ingestion layer is configured to receive data from one or more of the plurality of data producers, wherein the data is received in any format and the data ingestion layer supports both push and pull data ingestion mechanisms;
the data ingestion layer is configured to ingest the data using a producer proxy agent that securely ingests data of any format;
the data enrichment/transformation layer is configured to enrich or transform the data by inserting a new time stamp in the data; and
the data connection layer is configured to route the enriched or transformed data to one of the plurality of data stores at a velocity for the one of the plurality of data stores.

11. The system of claim 10, further comprising a data archiving layer, wherein the data archiving layer is configured to store the enriched or transformed data.

12. The system of claim 10, wherein the data ingestion layer is further configured to receive the data from a load balancer.

13. The system of claim 12, wherein the load balancer is configured to select the data ingestion layer based on geography to minimize latency.

14. The system of claim 10, wherein the enriched or transformed data is pushed or pulled to a customer data store.

15. The system of claim 10, wherein the one of the plurality of data stores is identified during onboarding.

16. The system of claim 10, wherein a data contract governs the ingestion of the data, the enriching or the transforming of the data, and storage of the enriched or transformed data.

17. A method for ingesting different data types, comprising:
providing, in a datacenter, a multi-layer pod comprising a data ingestion layer, a data enrichment/transformation layer, and a data connection layer, wherein the multi-layer pod is executed by a computer processor;
receiving, at the data ingestion layer in a multi-layer pod, data from a data producer, wherein the data is received in any format and the data ingestion layer supports both push and pull data ingestion mechanisms;
ingesting, by the data ingestion layer, the data using a producer proxy agent that securely ingests data of any format;

enriching or transforming, by the data enrichment/transformation layer, the data by replacing an IP address in the data with a host name; and routing, by the data connection layer, the enriched or transformed data to a data store at a velocity for the data store.

18. The method of claim 17, further comprising:

storing, by a data archive layer, the enriched or transformed data.

19. The method of claim 17, further comprising:

onboarding the data producer using a self-service process.

20. The method of claim 17, wherein the data ingestion layer receives the data from a load balancer, and the load balancer selects the data ingestion layer based on geography to minimize latency.

* * * * *